United States Patent
Zhu et al.

(10) Patent No.: US 9,275,004 B2
(45) Date of Patent: Mar. 1, 2016

(54) HYBRID FIREWALL FOR DATA CENTER SECURITY

(71) Applicants: Zhongwen Zhu, Saint-Laurent (CA); Makan Pourzandi, Montreal (CA)

(72) Inventors: Zhongwen Zhu, Saint-Laurent (CA); Makan Pourzandi, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 497 days.

(21) Appl. No.: 13/710,642

(22) Filed: Dec. 11, 2012

(65) Prior Publication Data

US 2014/0164619 A1  Jun. 12, 2014

(51) Int. Cl.

| G06F 15/173 | (2006.01) |
|---|---|
| G06F 15/177 | (2006.01) |
| G06F 9/455 | (2006.01) |
| G06F 9/50 | (2006.01) |
| H04L 29/06 | (2006.01) |
| G06F 21/53 | (2013.01) |

(52) U.S. Cl.
CPC .......... *G06F 15/177* (2013.01); *G06F 9/45558* (2013.01); *G06F 9/5077* (2013.01); *G06F 9/5083* (2013.01); *G06F 21/53* (2013.01); *H04L 63/0227* (2013.01); *G06F 2009/45587* (2013.01)

(58) Field of Classification Search
CPC . G06F 9/5083; G06F 9/5077; G06F 9/45558; G06F 2009/25562; G06F 16/177; H04L 63/02
See application file for complete search history.

(56) References Cited

U.S. PATENT DOCUMENTS

| 8,095,661 | B2 | 1/2012 | Tripathi | |
|---|---|---|---|---|
| 2008/0163357 | A1* | 7/2008 | Xiao | 726/15 |
| 2010/0058342 | A1 | 3/2010 | Machida | |
| 2011/0258621 | A1 | 10/2011 | Kern | |
| 2012/0210417 | A1 | 8/2012 | Shieh | |
| 2013/0124712 | A1* | 5/2013 | Parker | 709/224 |
| 2014/0068602 | A1* | 3/2014 | Gember et al. | 718/1 |
| 2014/0101656 | A1* | 4/2014 | Zhu et al. | 718/1 |
| 2014/0289418 | A1* | 9/2014 | Cohen et al. | 709/226 |
| 2015/0081885 | A1* | 3/2015 | Thomas et al. | 709/224 |

OTHER PUBLICATIONS

Hasan, M.Z. et al, "Integrated and autonomic cloud resource scaling", Apr. 16, 2012, Network Operations and Management Synposium (NOMS), 2012 IEEE, pp. 1327-1334.*
Hasan, Masum Z. et al.: "Integrated and Automatic Cloud Resource Scaling"; Apr. 16, 2012, XP032448820; pp. 1327-1334.
Lam, Ho-Yu et al.: "Hybrid Security Architecture for Data Center Networks"; Jun. 10, 2012, XP032274347; pp. 2939-2944.
International Search Report for PCT/IB2013/060822, mailing date of May 2, 2014; 5 Pages.

* cited by examiner

*Primary Examiner* — Jonathan Bui

(74) *Attorney, Agent, or Firm* — Ericsson Canada Inc.; David J. Rahmer

(57) ABSTRACT

A system and method for managing a hybrid firewall solution, employing both hardware and software firewall components, for a cloud computing data center is provided. A virtual application is hosted by a first plurality of application virtual machines and a second plurality of firewall virtual machines provides firewalling services for traffic associated with the virtual application. A cloud management entity determines that the virtual application requires an increased number of application virtual machines. A security profile for the virtual application is verified to determine if an increased number of firewall virtual machines is required by the increased number of application virtual machines. The cloud management entity can instantiate additional application virtual machines and firewall virtual machines as required.

16 Claims, 9 Drawing Sheets

HYBRID FIREWALL FOR DATA CENTER SECURITY

TECHNICAL FIELD

This invention relates generally to cloud computing security. In particular, systems and methods for managing hardware and software firewalling and other service requirements of a virtualized application.

BACKGROUND

With the rapid evolution of Cloud Computing it has become increasingly common to run computer programs on virtual machines operating on servers. A virtual machine (VM) is a software implementation of a machine (i.e. a computer) that executes programs like a physical machine. The physical hardware on which virtual machines run is referred to as the host or host computer(s) and can reside in data center facilities.

Data centers are facilities used to house computer systems and associated components, typically including routers and switches to transport traffic between the computer systems and external networks. Data centers generally include redundant power supplies and redundant data communications connections to provide a reliable infrastructure for operations and to minimize any chance of disruption. Information security is also a concern, and for this reason a data center must offer a secure environment to minimize any chance of a security breach.

Virtualization has several advantages over conventional computing environments. The operating system and applications running on a virtual machine often require only a fraction of the full resources available on the underlying physical hardware on which the virtual machine is running. A host system can employ multiple physical computers, each of which runs multiple virtual machines. Virtual machines can be created and shut down as required, thus only using the resources of the physical computer(s) as needed. A virtualized application can run on one or a number of virtual machines that can be scaled up or down as required by the application.

Another advantage of virtualization is the flexibility provided by the ability to manipulate and move a virtual machine from one physical site to another, or to move a virtual machine between hosts within the same data center. Virtual machines can be moved in order to better utilize the host machines and to provide the elasticity to scale up or down in size.

Many data centers use appliances, employing dedicated hardware and software, to provide various services in the data center. Such services can include firewall services, load balancing services, Unified Threat Management (UTM) services, intrusion detection and prevention systems (IDS/IPS), data loss prevention (DLP) systems, Proxy/Gateway services, and other security services.

FIG. 1 illustrates a data center 100 with a hardware appliance 102 deployed in front of the data center 100 providing firewall and security services. Data center 100 has 7 blades 104, 106, 108, 110, 112, 114, 116. Blades 1-5, 104-112, run virtual machines VM1-VM10 managed by virtualization layer 118. Blades 6 and 7, 114 and 116, run virtual storage components VS1-VS4 managed by virtualization layer 120. The hardware firewall 102 inspects and filters traffic from the network 122 to the data center 100. The capacity of this firewall 102 is determined based on the maximum throughput for the data center 100. In practice, this often leads to the over-dimensioning of the firewall 102.

If in the future, the data center 100 hardware is upgraded and the overall capacity of the data center 100 is increased, the firewall appliance 102 will also need to be upgraded to meet the increasing traffic demand. This type of operation may require service interruption, an investment in hardware/software upgrades, and a high operational cost.

Virtualization of the services provided by hardware appliances is also gaining momentum. For example, a virtual firewall (VF) is a network firewall service running entirely within a virtualized environment which can provide the same packet filtering and monitoring as is conventionally provided by a physical network firewall or firewall service appliance.

FIG. 2 illustrates a data center 200 employing a purely virtual firewall. Data center 200 has 7 blades 204, 206, 208, 210, 212, 214, and 216. Blades 1-5, 204-212, run virtual machines VM1-VM10 managed by virtualization layer 218. Blades 6 and 7, 214 and 216, run virtual storage components VS1-VS4 managed by virtualization layer 220. Blades 4 and 5, 210 and 212, can be provisioned to virtual machines VM7-VM10 running firewalling applications, or more simply called "virtual firewalls". Blade 4, 210, can be dedicated for virtual firewalls at all times, while blade 5, 212, can be assigned to the firewall when traffic increases. These virtual machines, VM9 and VM10, can be released when the traffic decreases. The virtual firewall can inspect and filter traffic from the network 222 to the data center 200 similar to the hardware firewall 102 of FIG. 1. A virtualized firewall service allows the resources to scale with the traffic requirements.

Therefore, it would be desirable to provide a system and method to integrate hardware and virtual firewall components and to mitigate the associated scalability problems.

SUMMARY

It is an object of the present invention to obviate or mitigate at least one disadvantage of the prior art.

In a first aspect of the present invention, there is provided a method for managing firewall requirements related to a virtualized application. A cloud computing management entity, including a processor, determines that a virtualized application, associated with a first plurality of application virtual machines and a second plurality of firewall virtual machines, requires an increased number of application virtual machines in the first plurality. It is determined that an increased number of firewall virtual machines is required by the increased number of application virtual machines. An application virtual machine is instantiated; and a firewall virtual machine is instantiated.

In an embodiment of the first aspect of the present invention, the required increased number of firewall virtual machines is determined in accordance with detecting that a firewall ratio threshold associated with the virtualized application is exceeded by the increased number of application virtual machines. The firewall ratio threshold can be included in an application profile configured at deployment of the virtualized application. The virtualized application can be hosted on the first plurality of application virtual machines and the second plurality of firewall virtual machines can provide firewalling services for traffic associated with the virtualized application.

In another embodiment, the method further comprises comparing the required increased number of application virtual machines to the number of firewall virtual machines in the second plurality.

In another embodiment, the method further comprises computing a ratio of the required increased number of application virtual machines to the number of firewall virtual machines in the second plurality; and comparing the computed ratio with a firewall ratio requirement associated with the virtualized application.

In another embodiment, the method further comprises comparing a bandwidth capacity of the required increased number of application virtual machines in the first plurality to a bandwidth capacity of the firewall virtual machines in the second plurality.

In another embodiment, the method further comprises comparing a bandwidth capacity of the required increased number of application virtual machines in the first plurality to a sum of a bandwidth capacity of the firewall virtual machines in the second plurality and a bandwidth of a hardware firewall provisioned for use by the virtualized application.

In another embodiment, the method further comprises the steps of determining that an increased number of load balancing virtual machines is required by the increased number of application virtual machines; and instantiating a load balancing virtual machine.

In another embodiment, the method further comprises the steps of determining that the virtualized application requires a decreased number of application virtual machines in the first plurality; determining that a decreased number of firewall virtual machines is required by the decreased number of application virtual machines; shutting down an application virtual machine; and shutting down a firewall virtual machine.

In a second aspect of the present invention, there is provided a cloud management entity comprising a memory for storing instructions and a processing engine configured to execute the instructions. The processing engine is configured to determine that a virtualized application, associated with a first plurality of application virtual machines and a second plurality of firewall virtual machines, requires an increased number of application virtual machines in the first plurality. The processing engine determines that an increased number of firewall virtual machines is required by the increased number of application virtual machines. The processing engine instantiates an application virtual machine and instantiates a firewall virtual machine.

In an embodiment of the second aspect of the present invention, the cloud management entity further comprises a communication interface for communicating with the first plurality of application virtual machines and the second plurality of firewall virtual machines.

In another embodiment, the determination that the increased number of firewall virtual machines is required is made in response to detecting that a firewall ratio threshold associated with the virtualized application is exceeded. The firewall ratio threshold can be included in an application profile configured at deployment of the virtualized application by the processing engine. The virtualized application can be hosted on the first plurality of application virtual machines and the second plurality of firewall virtual machines can provide firewalling services for traffic associated with the virtualized application.

In another embodiment, the processing engine compares the required increased number of application virtual machines in the first plurality to the number of firewall virtual machines in the second plurality.

In another embodiment, the processing engine computes a ratio of the required increased number of application virtual machines in the first plurality to the number of firewall virtual machines in the second plurality; and compares the computed ratio to a firewall ratio threshold associated with the virtualized application.

In another embodiment, the processing engine compares a bandwidth capacity of the increased number of application virtual machines in the first plurality to a bandwidth capacity of the firewall virtual machines in the second plurality.

In another embodiment, the processing engine compares a bandwidth capacity of the increased number of application virtual machines in the first plurality to a sum of a bandwidth capacity of the firewall virtual machines in the second plurality and a bandwidth capacity of a hardware firewall provisioned for use by the virtualized application.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

The present invention is directed to a system and method for managing a hybrid firewall solution employing both hardware and virtual firewall components. The hardware portion can be very specialized in basic operations and therefore, not required to be updated often. The capacity of the virtual firewall portion can vary with the capacity of the applications running in a data center at any given time. A pre-defined ratio between the virtual firewall and the virtualized applications can be enforced in order to avoid any bottlenecks or blockage for service traffic handling. The addition of extra virtual firewalls can be achieved by launching additional virtual machines dedicated to running the firewall service.

Different virtual applications can have different requirements, and therefore each application can have a different security ratio profile which can be configured at deployment of the application. This security ratio profile can be used to verify the ratio between the number of virtual firewalls and the number of virtual machines providing the application.

Alternatively, the security profile can define a ratio requirement for the bandwidth capacity, type of virtual machines, processing power, storage/memory, or a combination thereof, between the firewall virtual machines and the application virtual machines associated with the application.

Figure 1:
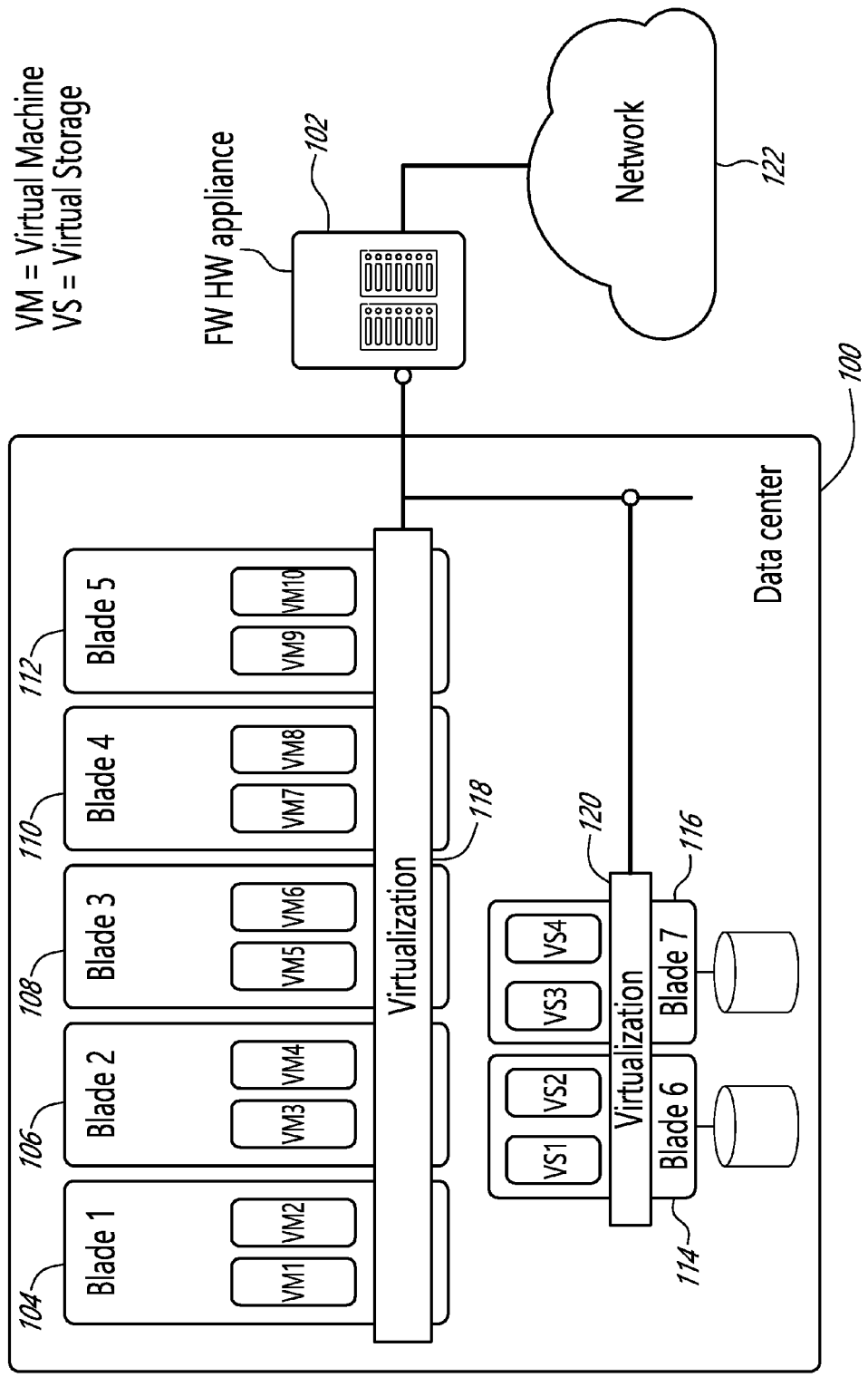
FIG. 1 is a block diagram of a prior art data center with a hardware firewall.
Figure 2:
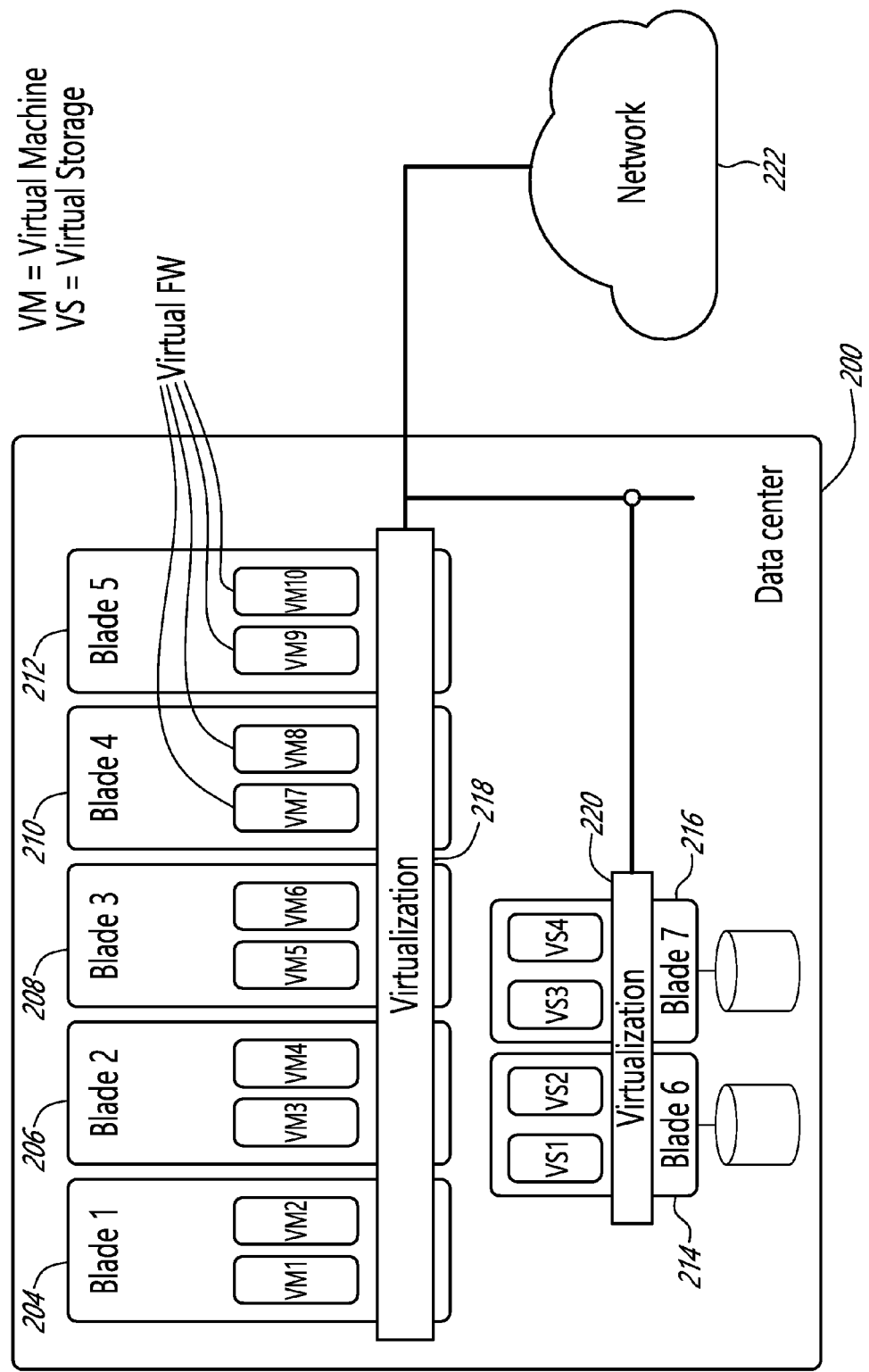
FIG. 2 is a block diagram of a prior art data center with a virtual firewall.
Figure 3:
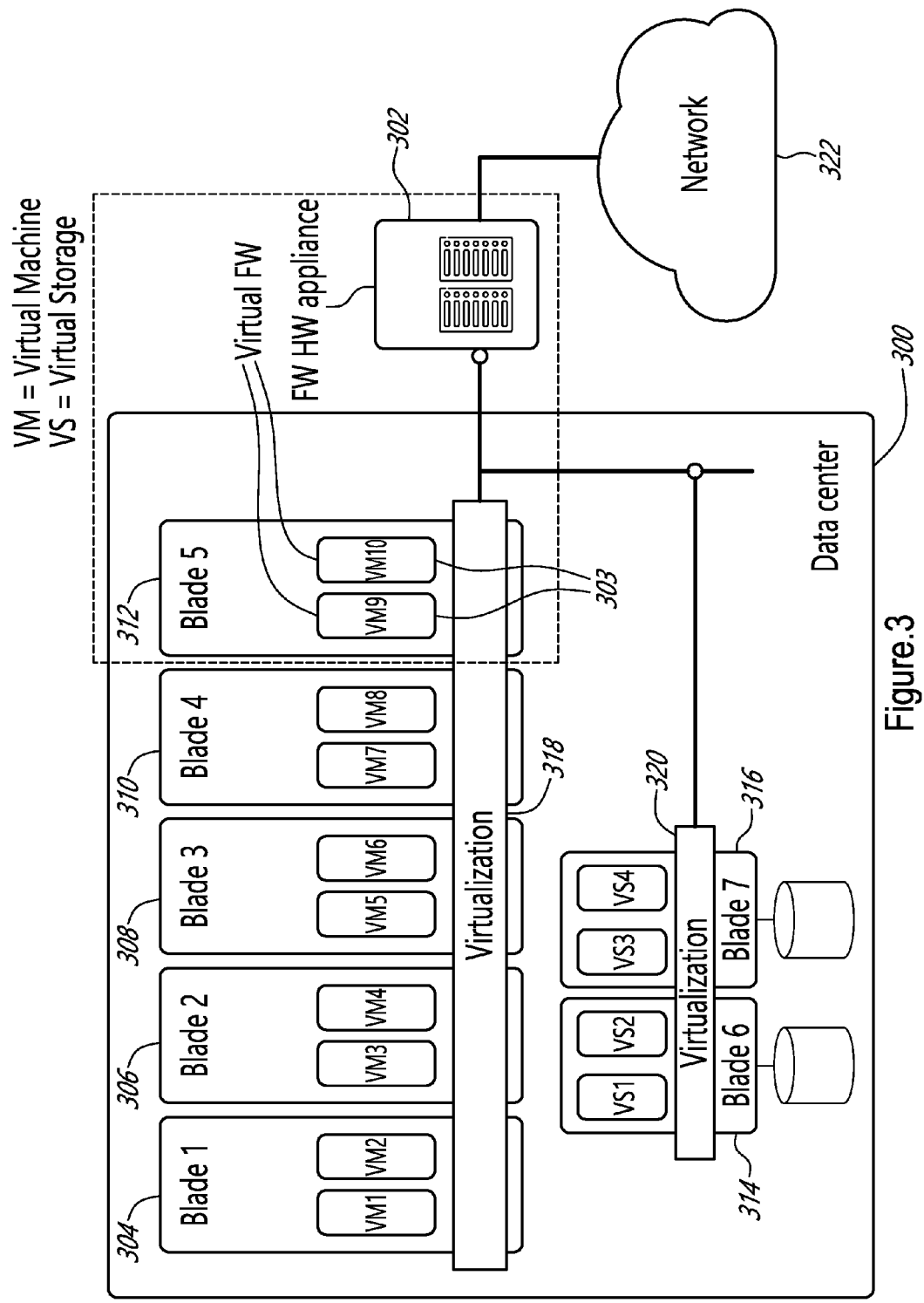
FIG. 3 is a block diagram of a data center with a hybrid firewall.

FIG. 3 illustrates a data center 300 employing a hybrid firewall. A hardware firewall 302 and a virtual firewall 303 are integrated to protect the data center 300. Data center 300 has 7 blades 304, 306, 308, 310, 312, 314, and 316. Blades 1-5, 304-312, provide virtual machines VM1-VM10 managed by virtualization layer 318. Blades 6 and 7, 314 and 316, provide virtual storage components VS1-VS4 managed by virtualization layer 320. Blade 5, 312, provides virtual machines VM9 and VM10 dedicated to running the virtual firewall service. The capacity of the hardware firewall 302 can be originally designed to handle all expected traffic from network 322 to the data center 300. As time passes, some hardware in the blades of the data center 300 can be upgraded and the overall data center 300 is able to handle more traffic. In this scenario, the firewall capacity may be exceeded and the hardware firewall 302 becomes a bottleneck. In order to handle the increased traffic, the virtual firewall 303 can be launched in blade 5, 312. A portion of the incoming traffic can then be routed towards the virtual firewall 303 to offload the demand on the hardware appliance 302.

Although FIG. 3 is only concerned with a hybrid hardware and virtual firewall, those skilled in the art will appreciate that the same concepts can be applied to other services in the data center, such as load balancing. In a further embodiment, the hardware portion can comprise a "shallow" load balancer, a shallow firewall and a hardware pattern matching component. These elements are all known to be efficiently implemented in hardware. By implementing these elements in hardware, the system can benefit from years of development in hardware technology for Internet Protocol (IP) based filtering and mechanisms for pattern matching to detect malware signatures in the packets. These elements are mainly configured at the time of deployment of the associated virtual application. There is no need for the hardware portion to know about the virtual application security profile as the filtering is done based on L3-L5 layer information and the application layer, L7, is not analyzed by the hardware portion. For example, the shallow load balancer can load balance using only a packet's IP 5-tuple (source IP address, source port, destination IP address, destination port, protocol). The shallow firewall can also filter using only the IP 5-tuple. The hardware pattern matching can use hardware regex and pattern recognition using hardware components in IP packets. A pre-defined set of malware signatures can be tested for in all IP packets, without requiring knowledge of the security profile of the associated virtual application.

The software portion of this example includes a virtual firewall and a virtual load balancer running on virtual machines and tuned to the security profile of the specific virtual application. These components can typically operate on the application layer, L7. Therefore there is a requirement at the deployment to set pre-defined parameters for the virtual application security profile. It is thus possible to create a well-tuned virtual firewall and/or load balancer for each specific application and to scale them up and down independently for each application. There is no urgent need for specialized hardware for these components, as the security mechanisms are based on algorithms such as behavioural monitoring which are typically monitored by general computers and are not as efficiently implemented on hardware in the industry.

It should be noted that the hardware portion of this hybrid approach is common for all the virtual applications in the data center, even though the security profiles for various virtual application can differ. The software portion is dedicated to each virtual application and can be tuned to their security profile. Although the hardware portion can be considered to be non-elastic and non-scalable, if traffic increases to an unmanageable level for the hardware portion, additional firewall virtual machines can be created in order to handle the extra traffic before routing it to the software components.

Figure 4A:
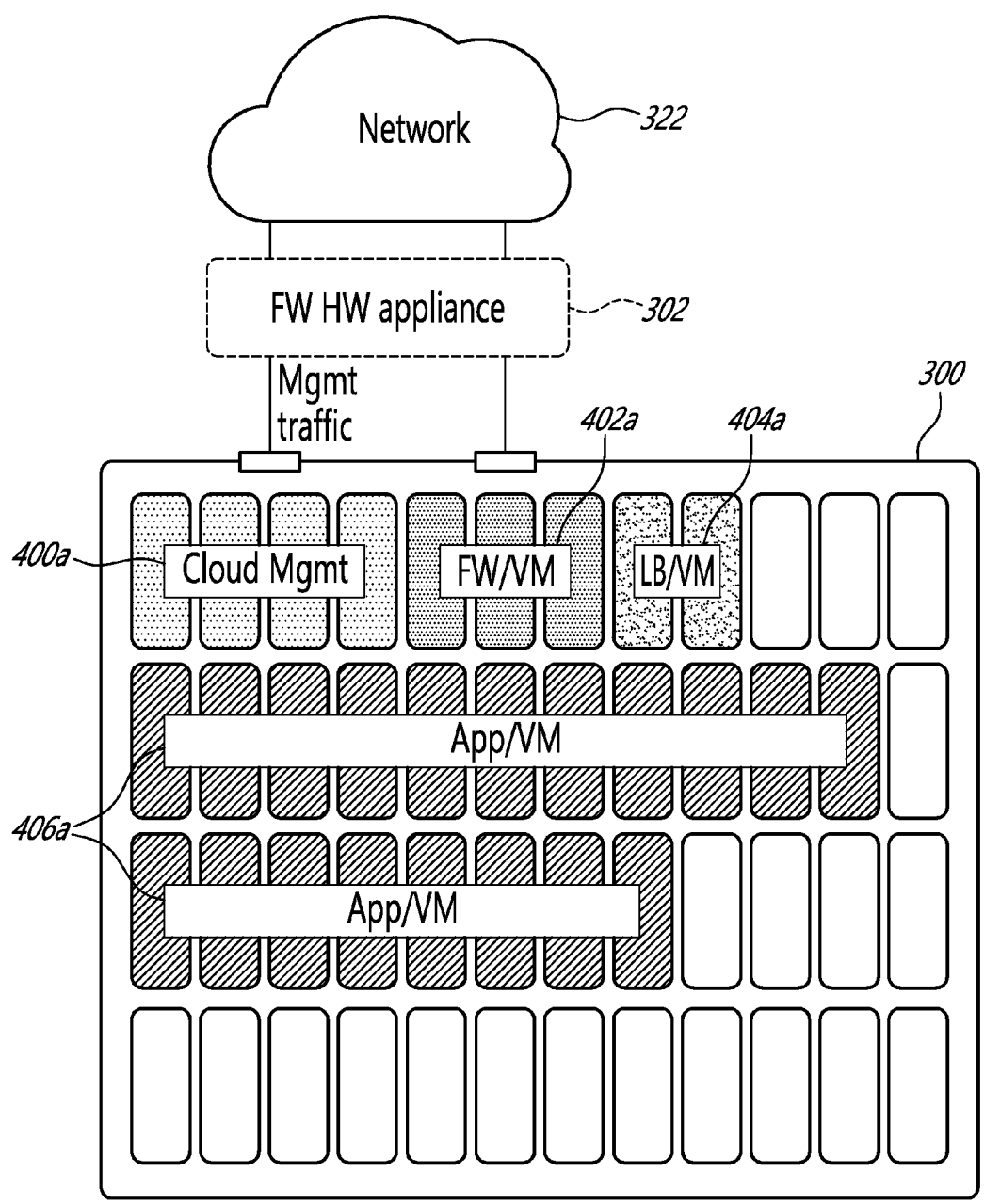
FIG. 4a is an example of virtual machine assignments at a first time.
Figure 4B:
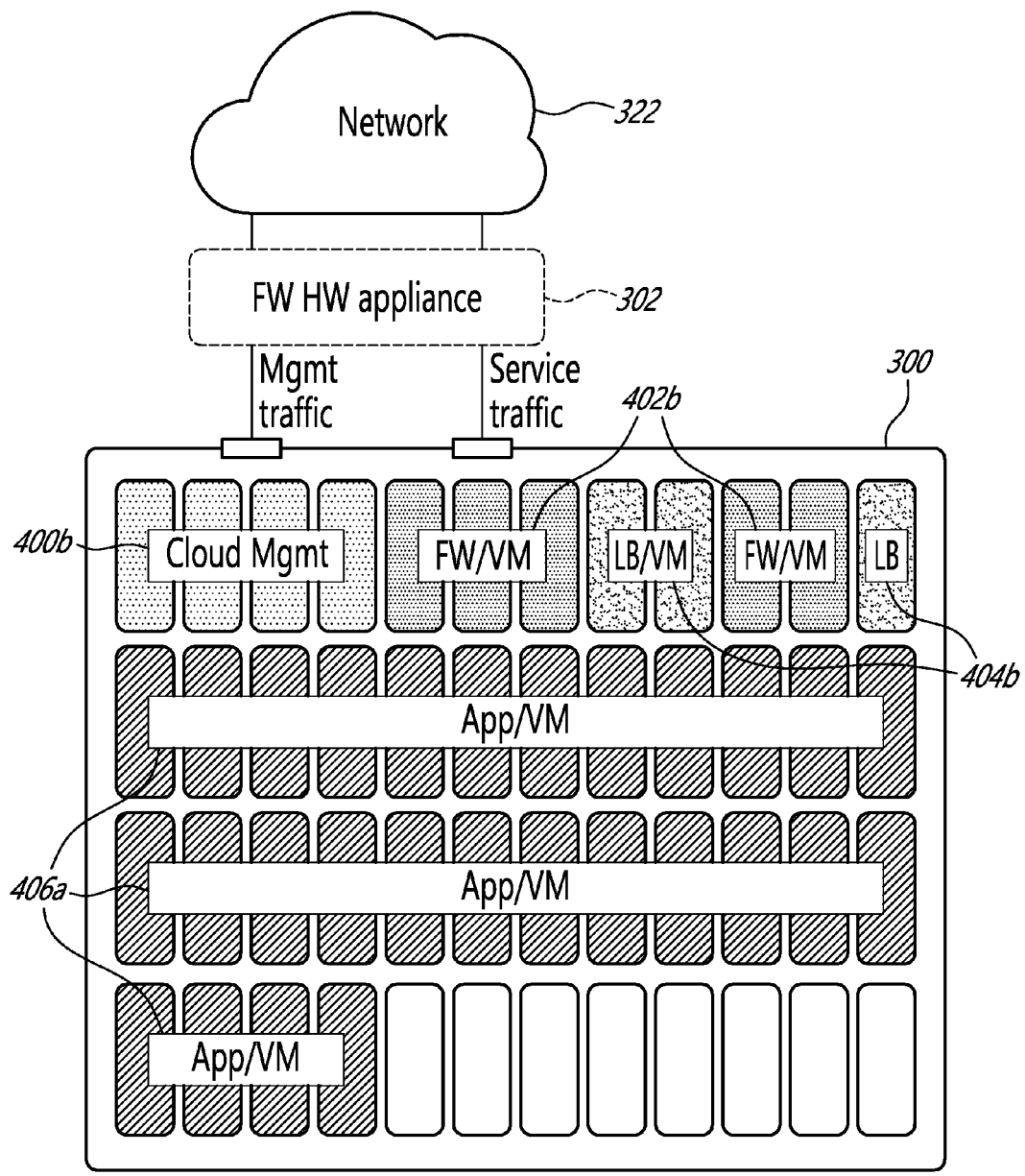
FIG. 4b is an example of virtual machine assignments at a second time.

In order to provide further scalability and enforce application security ratio profiles, as discussed above, a mechanism is provided for assigning virtual machines for different applications in the data center. FIGS. 4a and 4b illustrate example assignments of virtual machines in data center 300 at two different points of time, $t_1$ and $t_2$.

In FIG. 4a, at a first time $t_1$, four virtual machines are assigned for cloud management applications 400a, three virtual machines are assigned for firewall services 402a, two virtual machines are assigned for load balancing services 404a, and nineteen virtual machines are used for the application(s) 406a. In FIG. 4b, at a second time $t_2$, four virtual machines are assigned for cloud management applications 400b, five virtual machines are assigned for firewall services 402b, three virtual machines are assigned for load balancing services 404b, and twenty-eight virtual machines are used for the application(s) 406b. From this example, those skilled in the art will appreciate the relationship between the number of virtual machines assigned amongst the firewall, load balancing and applications.

In a private cloud computing environment, as opposed to a public data center, the exact types of applications to be deployed are known and finite. It is assumed that application developers can define profiles for their applications detailing a set of parameters to be met at deployment time. It can be assumed that at any time, many different virtual applications with differing pre-defined security profiles can run in the private cloud. For example in a Telecom cloud, an IP Multimedia Subsystem (IMS) profile, a Voice over IP (VoIP) profile, an Internet Protocol television (IPTV) profile, a Packet Data Network Gateway (PDN GW) profile and an Hypertext Transfer Protocol (HTTP) profile for web applications can all be defined.

As the requirements of these conventional Telecom applications are well known, it is possible to define a firewall ratio that sets out how many virtual firewalls need to be deployed for handling the traffic of X number of virtual machines associated with the virtual application. It should be noted that this ratio can be a function of the number of virtual machines running different types of applications inside the same virtual application or virtual application type. For example, a virtual IMS application can include virtual machines running traffic processors, input/output loaders and routers. The firewall ratio for the IMS application can be defined as a function of the total number of virtual machines running the various sub-applications within the virtual application.

The firewall ratio can be used as a basis to assign or distribute virtual machines for different applications. As opposed to simply waiting for the traffic load to reach a threshold and then launching additional virtual firewalls, the approach discussed herein is proactive and creates new virtual firewalls in parallel with creating new instances of the virtual machines for the application. The software component(s) of the security requirements can therefore be scaled up and down at the same time as the application itself scales up and down. Based on the combination of the different ratios for the various virtual applications, an overall ratio can also be defined for the data center.

Ratio profiles can also be created with respect to other virtualized services, such as load balancing. For example, a virtual application can have both a firewall ratio and a load balancing ratios defining the number of firewall virtual machines and number of load balancing virtual machines required for a certain number of application virtual machines.

Figure 5:
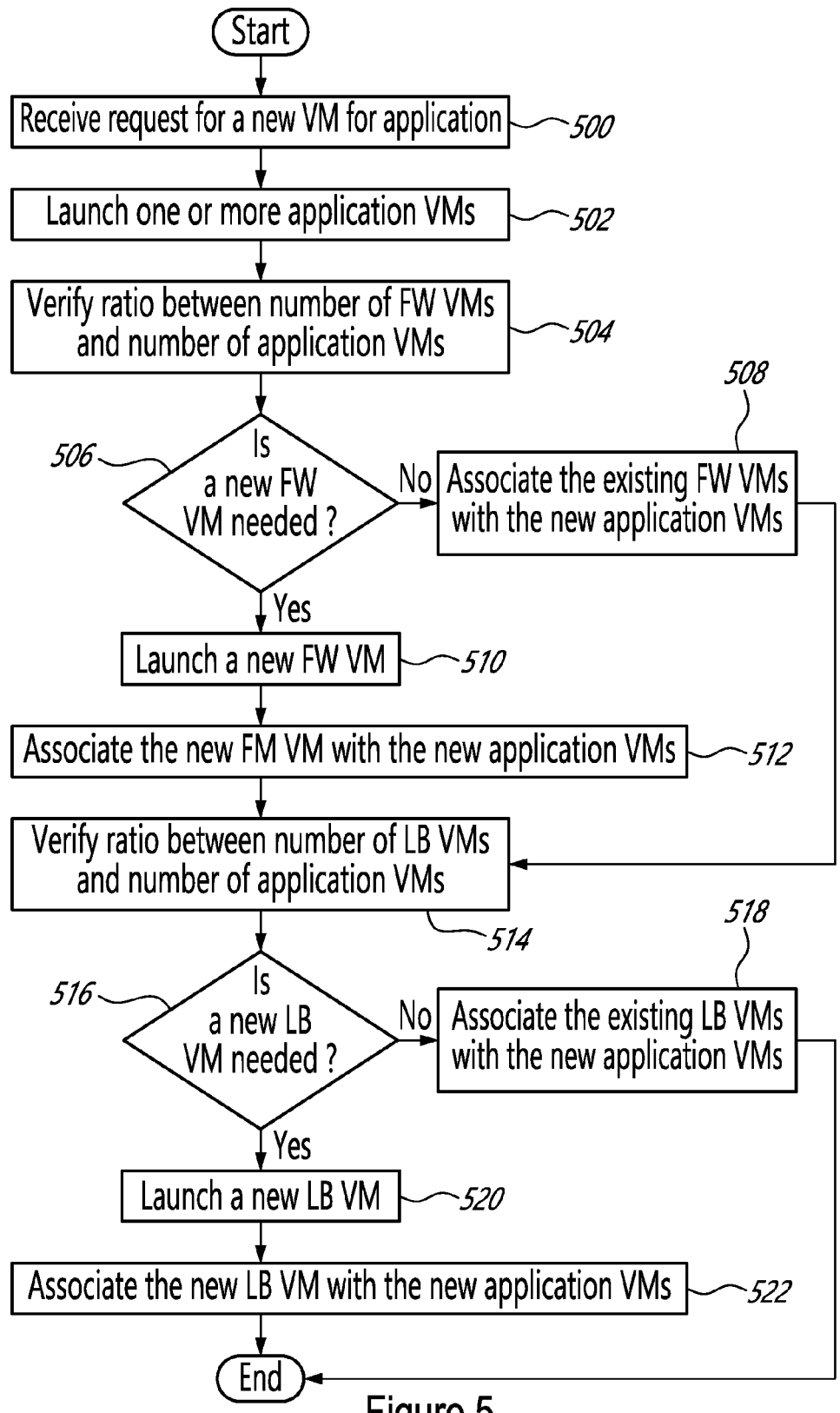
FIG. 5 is a flow chart illustrating an embodiment.

FIG. 5 is a flow chart illustrating an embodiment of the present invention for scaling new instances of virtual firewalls and virtual load balancers for a virtual application. This process can be performed by a cloud management system or application in a data center. The process begins by receiving a request for at least one additional virtual machine for an application (step 500). In response to the request, one or more application virtual machines are launched (step 502). The ratio between the number of virtual machines running firewall services and the number of virtual machines running the application is verified (step 504) in order to determine if additional firewall virtual machines are required (step 506). If no new firewall virtual machines are needed, the newly launched application virtual machine(s) can be associated with the existing firewall virtual machines (step 508). If an additional firewall virtual machine is required, it is launched (step 510) and associated with the new application virtual machine(s) (step 512). Optionally, the newly launched firewall virtual machine can be associated with both the existing firewall virtual machines and the existing application virtual machines.

After satisfying the firewall ratio for the virtual application, the load balancing ratio between the number of virtual machines running load balancing services and the number of virtual machines running the application can also be verified (step 514). It is determined if additional load balancing virtual machines are required to satisfy the ratio (516). If no new load balancing virtual machines are needed, the newly launched application virtual machine(s) can be associated with the existing load balancing virtual machines (step 518). If an additional load balancing virtual machine is required, it is launched (step 520) and associated with the new application virtual machine(s) (step 522). Similar to the firewall virtual machines, the newly launched load balancing virtual machine can optionally be associated with both the existing load balancing virtual machines and the existing application virtual machines.

In some embodiments, it may be necessary to determine if it is possible to launch additional virtual machines in the host(s) prior to launching a new firewall virtual machine in step 510 or a new load balancing virtual machine in step 520. In the case where the required additional virtual machines cannot be fulfilled, a corresponding alarm or notification can be delivered. The operator of the data center may consider increasing the overall capacity of the data center or leveraging additional resources.

Figure 6:
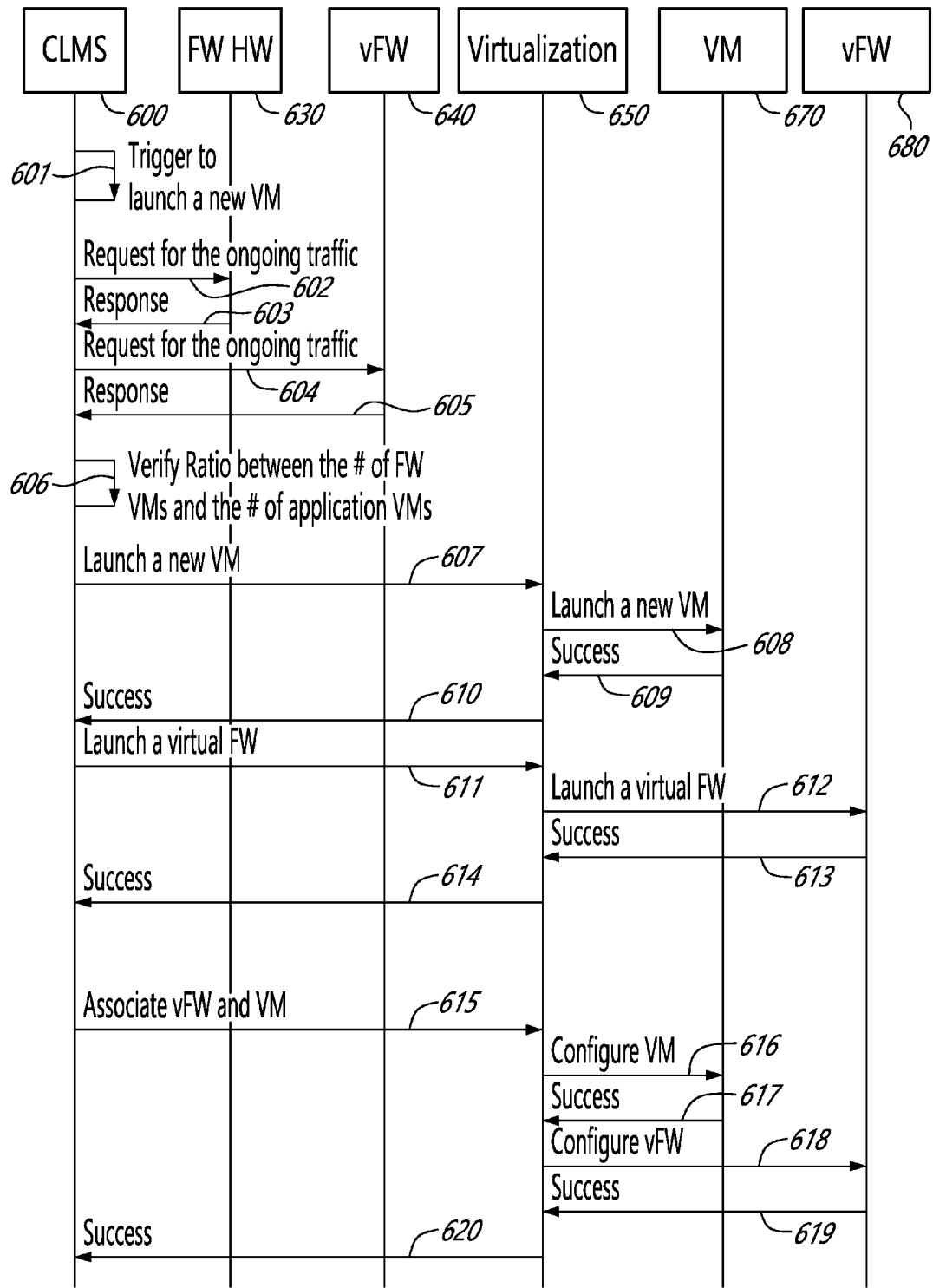
FIG. 6 is a call flow diagram illustrating an embodiment.

FIG. 6 is a call flow diagram illustrating another embodiment of the present invention. For the purpose of this example, it will be assumed that this process occurs in a single data center. In alternative embodiments, the cloud computing components can be located in multiple hosts in multiple data centers without departing from the scope of the invention. A cloud management device or entity 600 is provided at the data center. In some embodiments, the cloud management entity 600 may physically reside outside of the data centers or be distributed between various data centers. The cloud management entity 600 can be implemented as a dedicated blade for provisioning configuration management over the data centers and controlling the virtualization layer 650 and the underlying physical hardware. Virtualization layer 650 acts as the virtual machine manager, providing hardware virtualization which allows for a virtual operating platform for managing multiple or different operating systems and applications. Virtualization 650 can comprise one or more hypervisors. A hardware service appliance firewall 630 and a virtual firewall 640 are also provided in the data center. Virtual firewall 640 is shown as a single block in FIG. 6, but may be composed of a number of virtual machines.

The cloud management entity 600 receives a trigger to instantiate a new virtual machine for a virtual application (step 601). The cloud management 600 can decide that a new virtual machine is required based on a number of factors, including the traffic bandwidth being handled by the virtual application. The cloud management 600 requests a snapshot of the traffic being handled by the hardware firewall 630 (step 602) and the virtual firewall 640 (step 604). The hardware firewall 630 and the virtual firewall 640 return the requested information to the cloud management 600 (steps 603 and 605). In step 606, the ratio between the number of firewall virtual machines and the number of application virtual machines is compared in order to determine if additional firewall virtual machines are required. The ratio can be compared to a pre-defined security parameter associated with the virtual application. The parameter can define a threshold or requirement for a number of virtual machines dedicated to running the application corresponding to a number of virtual machines running the firewall service associated with the application. Alternatively, the parameter can define a traffic or bandwidth ratio requirement between the application virtual machines and the firewall virtual machines.

The cloud management 600 instructs the virtualization 650 to launch a new application virtual machine (step 607). The virtualization 650 instantiates the new virtual machine 670 (step 608). The successful instantiation of virtual machine 670 is acknowledged to the virtualization 650 (step 609) and cloud management 600 (step 610).

In accordance with determining that the firewall ratio for the application is not satisfied in step 606, the cloud management 600 instructs the virtualization 650 to launch a new firewall virtual machine (step 611). The virtualization 650 instantiates the new firewall virtual machine 680 (step 612). The successful instantiation of firewall virtual machine 680 is acknowledged to the virtualization 650 (step 613) and cloud management 600 (step 614).

Following the successful instantiation of new application virtual machine 670 and new firewall virtual machine 680, cloud management 600 can instruct the virtualization 650 to associate virtual firewall 680 with virtual machine 670 (step 615). Virtualization 650 sends configuration instructions (steps 616 and 618) to the virtual machine 670 and the virtual firewall 680 respectively. The successful configuration and association is acknowledged to virtualization 650 (steps 617 and 619) and the virtualization 650, in turn, acknowledges the success to the cloud management 600 (step 620).

In some embodiments, steps 606-620 can be repeated for other virtualized services, such as load balancing. As discussed with respect to FIG. 5, a load balancing ratio between the number of virtual machines running load balancing services and the number of virtual machines running the application can be verified to determine if an increased number of load balancing virtual machines is required.

It will be appreciated by those skilled in the art that order of steps shown in FIG. 6 is not essential to every embodiment of the present invention. For example, the cloud management entity 600 can choose to launch the additional virtual firewall

680 (steps 611-614) prior to launching the additional application virtual machine 670 (steps 607-610) without affecting the scope of the invention.

Figure 7:
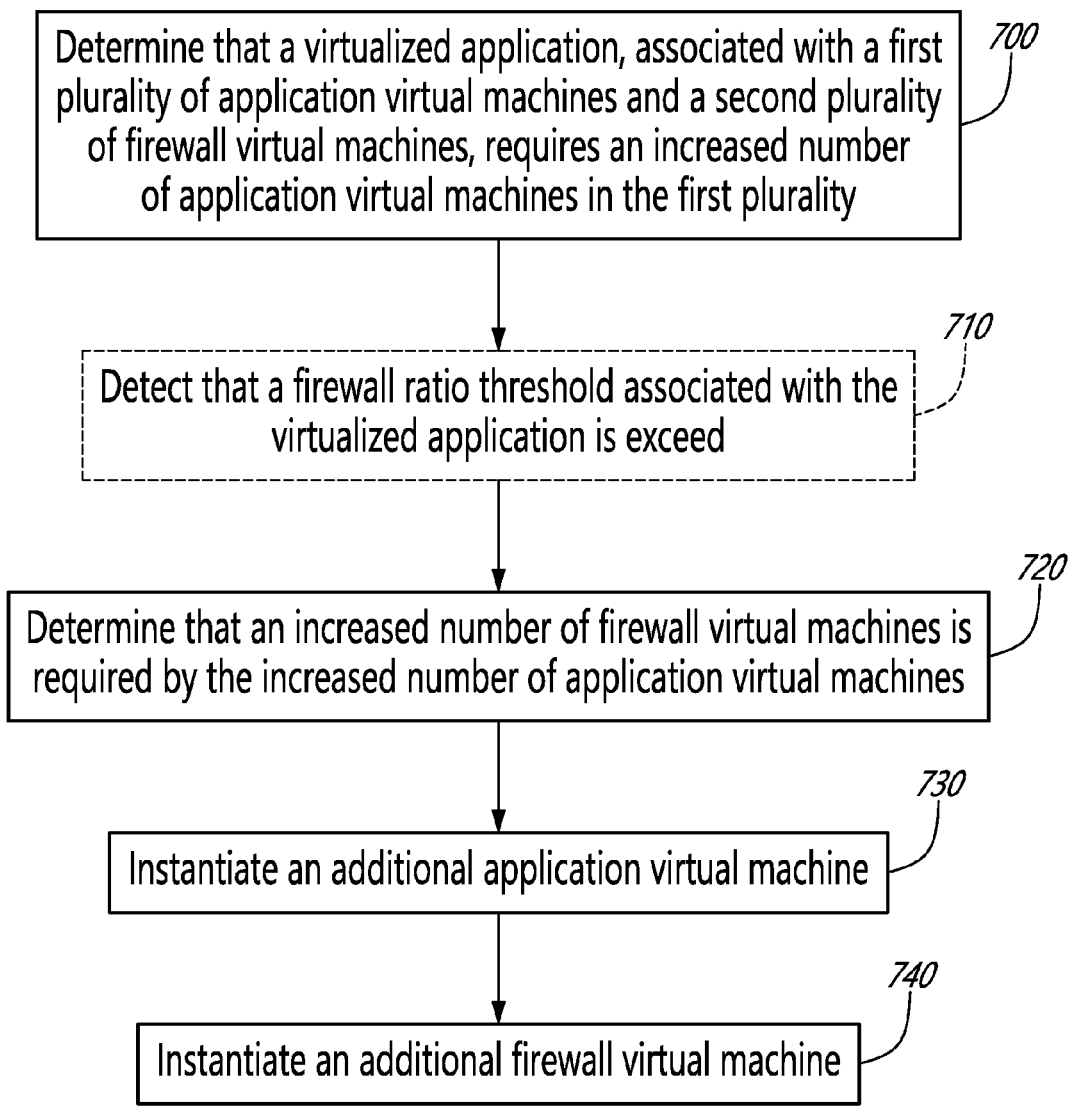
FIG. 7 is a flow chart of a method according to one or more embodiments.

FIG. 7 is a flow chart of a method according to one or more embodiments of the present invention. The process starts in block 700 by determining that a virtualized application, associated with a first plurality of application virtual machines and a second plurality of firewall virtual machines, requires an increased number of application virtual machines in the first plurality. This determination can be made in accordance with an increase in traffic associated with the virtualized application or any number of other factors. The virtualized application can be hosted on the first plurality of application virtual machines. The second plurality of firewall virtual machines can provide firewalling services for traffic associated with the virtualized application.

In block 710, optionally, it is detected that a firewall ratio threshold associated with the virtualized application is exceed by the increased number of application virtual machines determined to be required in block 700. The firewall ratio can be a predefined security profile requirement associated with the virtualized application. The application security profile can be configured at deployment of the virtualized application.

In some embodiments, the detection of block 710 is made in accordance with comparing the required increased number of application virtual machines in the first plurality to the number of firewall virtual machines in the second plurality. The total number of application virtual machines determined to be required by the virtualized application can be compared to the number of firewall virtual machines currently in the second plurality in order to determine if a firewall ratio threshold is exceeded. If the firewall ratio is exceeded, an increased number of firewall virtual machines is needed.

In other embodiments, the detection of block 710 is made in accordance with comparing the bandwidth capacity of the increased number of application virtual machines to the bandwidth capacity of the firewall virtual machines in the second plurality. The bandwidth capacity of the increased number application virtual machines can be a sum of each of capacities of the required number of application virtual machines. The bandwidth capacity of the firewall virtual machines can be a sum of the capacities of the firewall virtual machines currently in the second plurality. The respective bandwidth capacities can be compared to determine if the firewall ratio threshold is exceeded. Optionally, the bandwidth of a hardware firewall that has been provisioned for use with the virtualized application can also be considered. A sum of the provisioned bandwidth capacity of the hardware firewall and the bandwidth capacity of the plurality of the firewall virtual machines can be compared to the total bandwidth capacity of the required increased number of application virtual machines to determine if a firewall ratio threshold is exceeded. If the firewall ratio is exceeded, an increased number of firewall virtual machines is needed.

In block 720, it is determined that an increased number of firewall virtual machine is required by the increased number of application virtual machines. The determination that at least one additional firewall virtual machine is required by the virtualized application can be determined in accordance with detecting that a firewall ratio has been exceeded (in block 710). Alternatively, the determination that at least one additional firewall virtual machine is required by the virtualized application can be determined in response to determining that an increased number of application virtual machines is required (in block 700).

In block 730, an additional application virtual machine is instantiated. The instantiated application virtual machine can be added to the first plurality of application virtual machines. The instantiated additional application virtual machine may require being attached to, or being associated with, the initial first plurality of application virtual machines through its configuration process.

In block 740, an additional firewall virtual machine is instantiated. The instantiated firewall virtual machine can be added to the second plurality of firewall virtual machines. The instantiated additional firewall virtual machine may require being attached to, or being associated with, the initial second plurality of firewall virtual machines through its configuration process.

In an alternative embodiment, an increased number of load balancing virtual machines can be determined to be required by the increased number of application virtual machines. Similar to discussion related to the firewall ratio, a security profile associated with the virtualized application can define a ratio requirement for number of load balancing virtual machines as compared to application virtual machines. This ratio can be verified in response to determining that an increased number of application virtual machines is required. Accordingly, a load balancing virtual machine can be instantiated.

In another alternative embodiment, it can be determined that the virtualized application requires a decreased number of application virtual machines in the first plurality. In accordance with verifying the firewall ratio, it can be determined that a decreased number of firewall virtual machines is required by the decreased number of application virtual machines. An application virtual machine and a firewall virtual machine can be shut down as required.

As will be apparent to one skilled in the art, in some embodiments, the order of steps in FIG. 7 can be modified without departing from the intended scope of the present invention. For example, an additional virtual machine can be instantiated (block 730) prior to verifying the firewall ratio or determining that an increased number of firewall virtual machines is required. The determination of block 720, that an increased number of firewall virtual machines is required, is triggered by the determination that the virtual application requires an increased number of application virtual machines and can be made prior to or following the launch of any additional virtual machine(s). Similarly, the firewall ratio can be checked using the required increased number of application virtual machines, whether the increased number has been launched yet or not.

Figure 8:
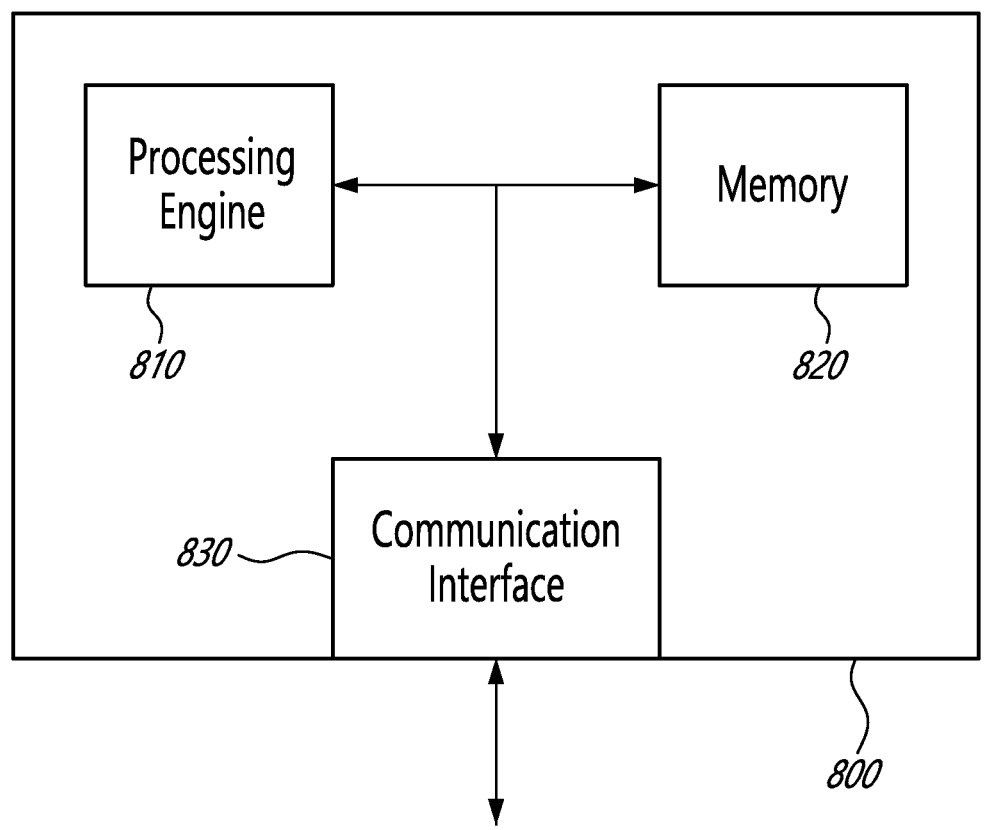
FIG. 8 is a block diagram of an example cloud management device.

FIG. 8 is a block diagram illustrating functional details associated with an example cloud management entity or device 800. The cloud management device 800 can include a processing engine 810, a memory 820 and a communication interface 830. The cloud management device 800 can be implemented using dedicated underlying hardware or alternatively can, itself, be implemented as a virtual machine in a data center. The cloud management device 800 can perform the various embodiments, as described herein, related to managing virtual applications and their associated virtual services. The cloud management device 800 can perform these operations in response to a processing engine 810 executing instructions stored in a data repository such as memory 820. The instructions can be software instructions and the data repository can be any logical or physical computer-readable medium. The cloud management device 800, though shown in FIG. 8 as a single entity, can be implemented by a number of different devices that are geographically distributed, as previously discussed.

The processing engine 810 determines that a virtualized application, associated with a first plurality of application virtual machines and a second plurality of firewall virtual machines, requires an increased number of application virtual machines in the first plurality. In response to determining the required increased number of application virtual machine, the processing engine 810 determines that an increased number of firewall virtual machines is also required by the virtualized application. Accordingly, a new application virtual machine and a new firewall virtual machine are instantiated by the processing engine 810.

The processing engine 810 can determine that the virtualized application requires an increased number of firewall virtual machines in response to detecting that a firewall ratio threshold is exceeded. The firewall ratio threshold can be a security requirement, associated with the virtualized application, defining the number of firewall virtual machines required per application virtual machine. Alternatively, the firewall ratio threshold can define a bandwidth capacity requirement for the firewall virtual machines as compared to the bandwidth capacity of the increased number of application virtual machines. Optionally, a bandwidth capacity of a hardware firewall provisioned for use by the virtualized application can also be considered when checking the firewall ratio threshold.

The communication interface 830 can be used for communicating with the first plurality of application virtual machines and the second plurality of firewall virtual machines, or with their associated hypervisor(s). The processing engine 810 can issue and receive instructions through the communication interface 830. The cloud management device 800 is capable of communicating with the various entities, both physical and virtual, in the cloud computing environment.

The embodiments described herein have been directed to virtual services such as firewall and load balancing services. Those skilled in the art will appreciate that the mechanisms presented herein can be applied to any service running on virtual machines. Examples of other virtual services include an Internet Protocol Security (IPSec) service, a Virtual Private Network (VPN) service, a load balancing service, an intrusion detection and prevention system (IDS/IPS), or a Unified Threat Management (UTM) service.

The hybrid firewall mechanism of the present invention decouples the hardware portion from the software portion for increased flexibility and scalability. This approach disassociates the rapidly changing general central processing unit (CPU) technology from that of specialized hardware. As data center blades are upgraded over time to the latest technology, this approach enables the data center administrator to change the firewall ratios of the virtual applications to accommodate the upgrades. There is no need to upgrade the specialized hardware firewall as the virtual firewalls will improve as much as virtual machines used for the virtual applications.

Embodiments of the invention may be represented as a software product stored in a machine-readable medium (also referred to as a computer-readable medium, a processor-readable medium, or a computer usable medium having a computer-readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for managing firewall requirements related to a
    virtualized application by a cloud management entity having a processing engine, comprising:
        responsive to determining, by the processing engine, that a virtualized application, associated with a first plurality of application virtual machines and a second plurality of firewall virtual machines, requires an increased number of application virtual machines in the first plurality, instantiating an application virtual machine;
        comparing a bandwidth capacity of the required increased number of application virtual machines in the first plurality to a bandwidth capacity of the firewall virtual machines in the second plurality to determine whether a firewall ratio is exceeded by the increased number of application virtual machines; and
        responsive to determining, by the processing engine, that the firewall ratio is exceeded, instantiating a firewall virtual machine.

2. The method of claim 1, wherein the firewall ratio threshold is included in an application profile configured at deployment of the virtualized application.

3. The method of claim 1, further including the step of comparing the required increased number of application virtual machines to the number of firewall virtual machines in the second plurality.

4. The method of claim 1, further including the steps of:
    computing a ratio of the required increased number of application virtual machines to the number of firewall virtual machines in the second plurality; and
    comparing the computed ratio with a firewall ratio requirement associated with the virtualized application.

5. The method of claim 1, further including the step of comparing a bandwidth capacity of the required increased number of application virtual machines in the first plurality to a sum of a bandwidth capacity of the firewall virtual machines in the second plurality and a bandwidth of a hardware firewall provisioned for use by the virtualized application.

6. The method of claim 1, wherein the virtualized application is hosted on the first plurality of application virtual machines and the second plurality of firewall virtual machines provide firewalling services for traffic associated with the virtualized application.

7. The method of claim 1, further including the steps of adding the instantiated application virtual machine to the first plurality; and adding the instantiated firewall virtual machine to the second plurality.

8. The method of claim 1, further including responsive to determining that an increased number of load balancing virtual machines is required by the increased number of application virtual machines, instantiating a load balancing virtual machine.

9. The method of claim 1, further including the steps of:
  determining that the virtualized application requires a decreased number of application virtual machines in the first plurality;
  determining that a decreased number of firewall virtual machines is required by the decreased number of application virtual machines;
  shutting down an application virtual machine; and
  shutting down a firewall virtual machine.

10. A cloud management entity, comprising:
  a memory for storing instructions; and
  a processing engine, configured to execute the instructions, for, responsive to
  determining that a virtualized application, associated with a first plurality of application virtual machines and a second plurality of firewall virtual machines, requires an increased number of application virtual machines in the first plurality, instantiating an application virtual machine; for comparing a bandwidth capacity of the required increased number of application virtual machines in the first plurality to a bandwidth capacity of the firewall virtual machines in the second plurality to determine whether a firewall ratio is exceeded by the increased number of application virtual machines; and for, responsive to determining that the firewall ratio is exceeded, instantiating a firewall virtual machine.

11. The cloud management entity of claim 10, further comprising a communication interface for communicating with the first plurality of application virtual machines and the second plurality of firewall virtual machines.

12. The cloud management entity of claim 10, wherein the firewall ratio threshold is included in an application profile configured at deployment of the virtualized application by the processing engine.

13. The cloud management entity of claim 10, wherein the processing engine compares the required increased number of application virtual machines in the first plurality to the number of firewall virtual machines in the second plurality.

14. The cloud management entity of claim 10, wherein the processing engine computes a ratio of the required increased number of application virtual machines in the first plurality to the number of firewall virtual machines in the second plurality; and compares the computed ratio to a firewall ratio threshold associated with the virtualized application.

15. The cloud management entity of claim 10, wherein the processing engine compares a bandwidth capacity of the increased number of application virtual machines in the first plurality to a sum of a bandwidth capacity of the firewall virtual machines in the second plurality and a bandwidth capacity of a hardware firewall provisioned for use by the virtualized application.

16. The cloud management entity of claim 10, wherein the virtualized application is hosted on the first plurality of application virtual machines and the second plurality of firewall virtual machines provide firewalling services for traffic associated with the virtualized application.

* * * * *